(No Model.)
E. P. DONNELL.
DEVICE FOR HANGING SAWS.
No. 265,037. Patented Sept. 26, 1882.
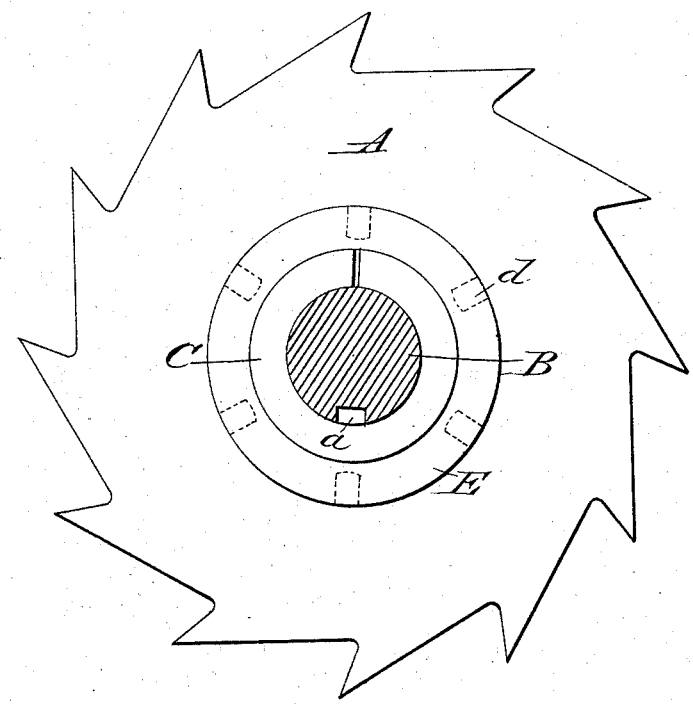
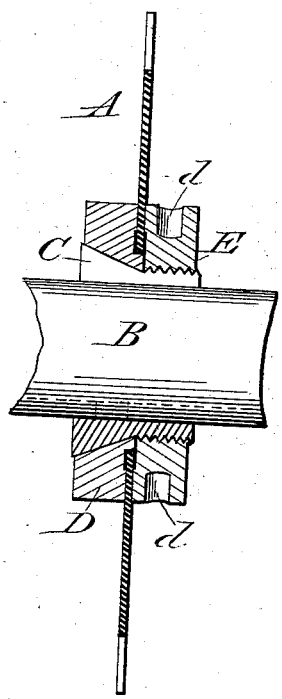
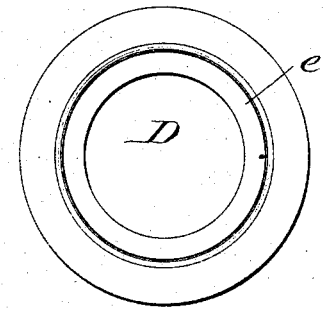
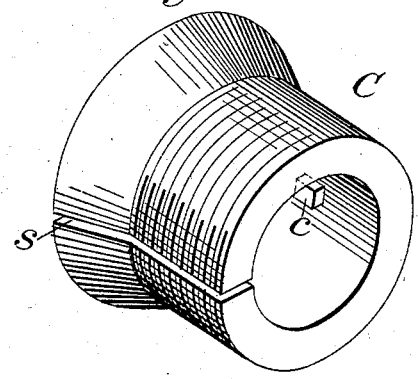
Attest:
F. H. Schott
Jno. A. Hockman
Inventor:
Edward P. Donnell
By J. C. Tasker
Atty.

UNITED STATES PATENT OFFICE.

EDWARD P. DONNELL, OF CHICAGO, ILLINOIS.

DEVICE FOR HANGING SAWS.

SPECIFICATION forming part of Letters Patent No. 265,037, dated September 26, 1882.

Application filed May 4, 1882. (No model.)

*To all whom it may concern:*

Be it known that I, EDWARD P. DONNELL, a citizen of the United States of America, residing at Chicago, in the county of Cook and State of Illinois, have invented a certain new and useful Improvement in Fastening Saws to Mandrels, of which the following is a specification.

My invention relates to an improvement in the manner of fastening saws to mandrels.

The object of my invention is to provide a device by means of which saws may be firmly secured to a mandrel at any desired point along in the length of said mandrel.

To this end my invention consists in a combination and arrangement of parts hereinafter fully described and claimed.

In the accompanying drawings, Figure 1 is a side elevation of a saw secured to a mandrel with my improved device. Fig. 2 is a sectional elevation of the same; and Figs. 3 and 4 are detailed views, referred to hereinafter.

Similar letters of reference refer to like parts throughout the several views.

In the drawings, A represents an ordinary saw; B, the mandrel, provided with a key wall or groove, *a*. On the mandrel B is slipped a split collar, C, provided on the inside with a projection, *c*, which fits in the groove *a* in mandrel B. This collar C is screw-threaded on its outer surface for about half its length, the remaining part being tapered, as shown in Figs. 2 and 3, and has a slot, *s*, extending the whole of its length, rendering it capable of being clamped firmly on the mandrel B, as hereinafter set forth. On the split collar C is a solid collar, D, bored out with a taper corresponding with the taper of the split collar C, and provided on its inner face with an annular projection, *e*, which corresponds in size to the eye of the saw to be used. (See Fig. 4.)

E is a round nut or collar, provided on its periphery with a number of holes, *d*, to receive the end of a wrench or bar in tightening up the saw, in the manner described more fully hereinafter, and bored out and internally screw-threaded to receive the threaded portion of the split collar C.

The manner of securing a saw on the mandrel with this device is as follows: The split collar C, with collar D thereon, is slipped on the mandrel B with the projection *c* in the slot *a*. The eye of the saw A is placed over the annular projection *e* on collar D, and the nut E screwed on the threaded portion of split collar C. As the nut is tightened against the saw by means of a spanner-wrench engaging with the holes *d* or otherwise, the split collar C is drawn into the tapered portion of collar D, closing said collar C tightly to the mandrel B, and at the same time clamps the saw firmly between the faces of collar D and nut E.

The face of collar D and nut E, where they come against the saw, may be recessed slightly near the center to secure a perfect fit against the saw near the outer edge, which is generally desirable.

In some cases the groove *a* and projection *c* may be dispensed with, the clamping of the mandrel B by the split collar C being sufficient to hold it firmly.

It will be seen that by this device a saw may be readily secured at any point on mandrel, and is particularly adapted for use with saws used in gangs on the same mandrels where it is desired to change the relative positions of said saws. All the parts being around the mandrel and slipped on from the end, there is no possibility of any part being thrown with disastrous results, as is the case with some fastening devices now in use, even should the said parts become loose.

Having thus described my invention, what I claim as new, and desire to secure by Letters Patent, is—

1. In a saw-fastening device, the combination of a split collar, C, having its exterior partly tapered and partly screw-threaded, a solid collar, D, having a tapering bore corresponding with the taper of the split collar, to which it is fixed, and a nut, E, adapted to fit the threaded portion of the split collar, substantially as shown and described.

2. A split collar, C, tapered and screw-threaded, as shown and described, and provided with a projection, *c*, a correspondingly-tapered collar, D, with annular projection *e*, and a nut, E, in combination with mandrel B, having a groove, $a$, substantially as shown and described.

3. The combination of the tapered and screw-threaded split collar C, having projection $c$, correspondingly-tapered collar D, with annular projection $e$, nut E, having holes $d$, saw A, and mandrel B, having groove $a$, substantially as shown and described.

In testimony whereof I affix my signature in presence of two witnesses.

EDWARD P. DONNELL.

Witnesses:
 FRANK JOHNSON,
 CLACK S. HARRISON.